UNITED STATES PATENT OFFICE.

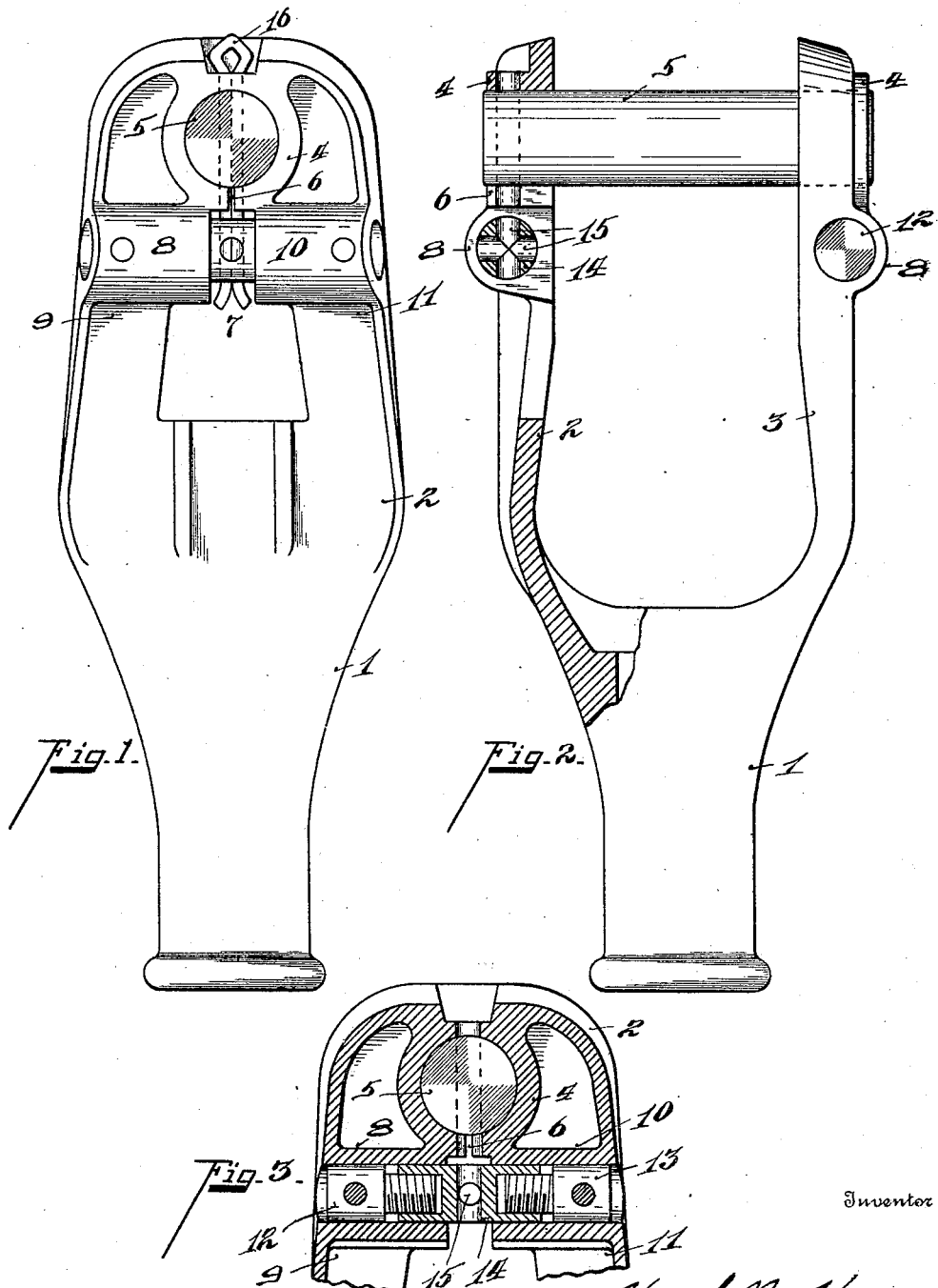

HUGH W. KIMES, OF DAYTON, OHIO, ASSIGNOR OF TWO-THIRDS TO J. H. VAILE, OF DAYTON, OHIO.

TROLLEY-HARP.

No. 886,517.  Specification of Letters Patent.  Patented May 5, 1908.

Application filed January 13, 1908. Serial No. 410,664.

*To all whom it may concern:*

Be it known that I, HUGH W. KIMES, a citizen of the United States, residing at Dayton, in the county of Montgomery and State of Ohio, have invented certain new and useful Improvements in Trolley-Harps, of which the following is a specification.

My invention relates to an improvement in a trolley-harp.

The objects of the invention are:—First, to clamp the axle rigidly in the harp in a manner to insure constant contact between them. Second, to effectually lock the clamp in its set position. These and other features of the invention will be more fully set forth in the description of the accompanying drawings, forming a part of this specification, in which:—

Figure 1 is a side elevation of my improved trolley-harp. Fig. 2 is a front elevation partly in section. Fig. 3 is a vertical longitudinal section through one of the limbs of the harp.

In trolley-harps great difficulty results from the mounting of the axle in the harp. Under the normal operating conditions great and incessant strains are brought to bear upon the axle and harp, which soon break or loosen the fastening means, such as the conventional cotter pin. The axle thereupon begins to chatter or vibrate in the orifices of the harp, and rapidly wears away or breaks. This loosening also materially impairs the electric connection between the axle and harp. And further, the incessant vibration of the axle in its support and the increased circuit resistance caused thereby, produce intense heat which is destructive to the parts. This heat is particularly injurious in trolley-harps employing bushings or packings of graphite or like materials. By my invention these disadvantages are entirely eliminated and the axle is clamped solidly in the harp, and the clamp is pinned in its set position.

1 represents the trolley-harp having the bifurcated limbs 2, 3. I will only describe one of the limbs, the other being a duplicate. The upper end of the limb has a downwardly depending collar 4 in which the axle 5 is held. This collar has the split 6 at its lower end, and that portion of the limb under the split is cut out, as shown at 7, in Fig. 1, to enable the split collar to be clamped upon the axle.

8 represents a sleeve formed integrally with the side rim 9 of the limb, and 10 represents a second sleeve opposite sleeve 8 formed integral with the side rim 11 of the limb. These sleeves are also preferably formed integrally with the lower portion of the split collar. Within these sleeves are fixed right and left hand threaded screws 12, 13. 14 represents a nut engaging said screws and having its head portion lying between the inner ends of the sleeves 8, 10, and provided with the intersecting pin holes 15.

16 represents a cotter pin passing through the split collar, the axle, and the bolt head, and clenched on the under side thereof.

In operation the axle is inserted through the trolley wheel and split collars 4. A pin is inserted in the orifices 15 for turning the nut 14, and the sections of the split collar are drawn together and clamped rigidly upon the axle. One of the pin holes 15 is alined with the cotter pin holes of the split collar, the cotter pin is slipped through the collar, axle and nut, and clenched on the under side of the nut. This compression being considerable and uniformly around the axle, it is rigidly held in constant contact with the collars. The cotter pins not only hold the axle in position longitudinally, but lock the clamp in its set position, so that loosening is practically impossible.

Should there be any wear it is a simple matter to reclamp the collar on the axle, or to replace the broken parts.

I have shown only the preferred form of the several equivalent constructions which would readily suggest themselves to the skilled mechanic in view of this disclosure, but the invention is not limited thereto, except where specifically so claimed.

Having described my invention, I claim:—

1. In a trolley-harp and axle, a split collar, means for clamping the sections on the axle, and means for locking the clamp in set position, substantially as described.

2. In a trolley-harp and axle, a split collar, means for clamping the sections on the axle, and means for pinning the axle in the collar and also locking the clamp in its set position, substantially as described.

3. In a trolley-harp and axle, a split collar, independent sleeves connecting the split ends of the collar with the outer rim of the harp limb, and two single ended bolts, clamping means secured within said sleeves, and means for locking said clamping means in set position, substantially as described.

4. In a trolley-harp and axle, one of the limbs having a collar split adjacent to an exteriorly cut out portion of the limbs, sleeves connecting the split ends of the collar with the rim of the limb, means for clamping the collar on the axle, and a pin passed through the collar, axle, and clamping means, holding the latter in set position, substantially as described.

In testimony whereof, I have hereunto set my hand.

HUGH W. KIMES.

Witnesses.
WILLSMORE B. TURNER,
ROBERT E. COWDEN.